United States Patent Office 3,182,265
Patented May 4, 1965

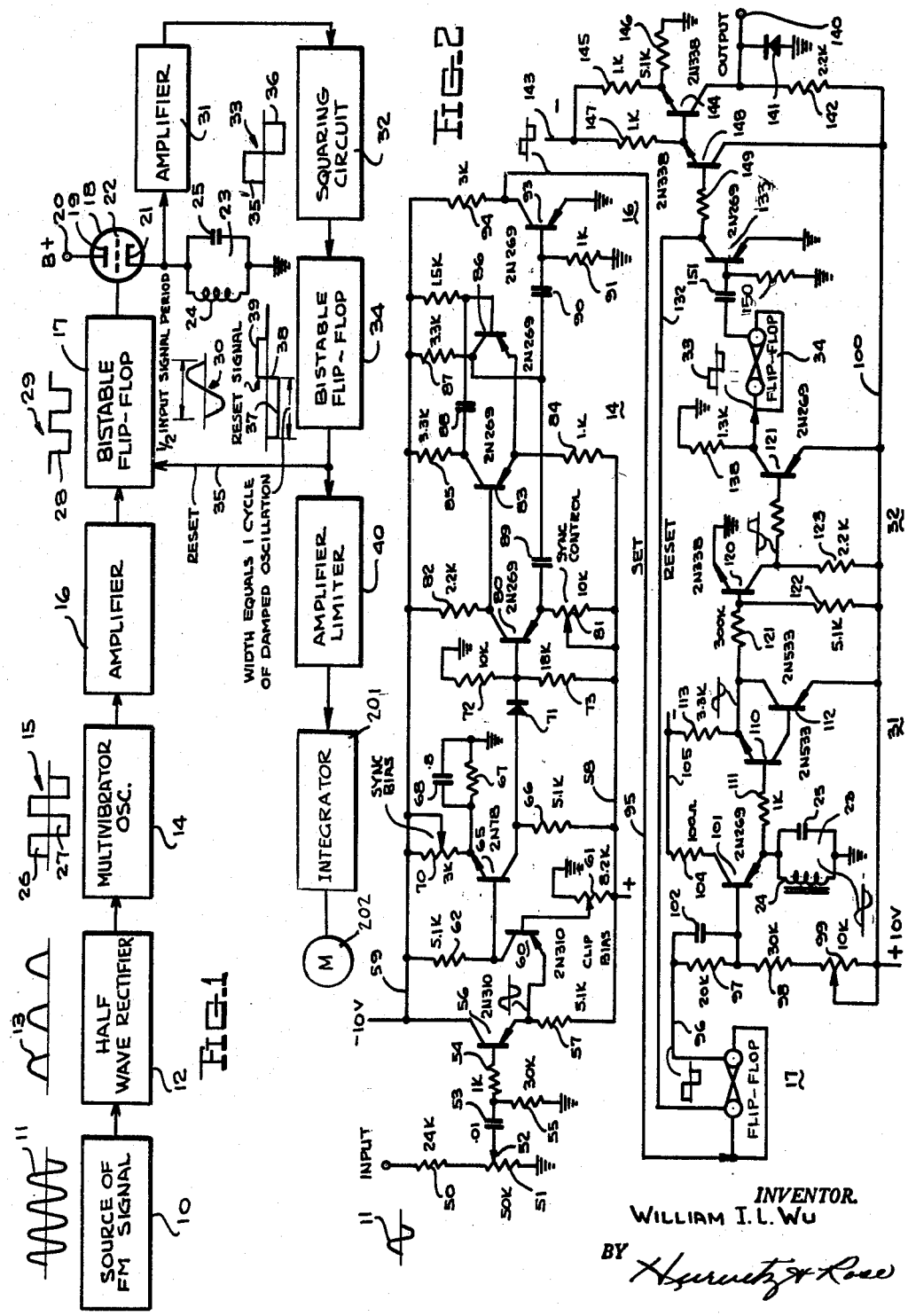

3,182,265
FREQUENCY DISCRIMINATOR EMPLOYING
A TIMING CIRCUIT
William I. L. Wu, New Rochelle, N.Y., assignor, by mesne assignments, to the Singer Company, a corporation of New Jersey
Filed Mar. 2, 1960, Ser. No. 12,464
16 Claims. (Cl. 328—140)

The present invention relates generally to frequency discriminators, and more particularly to bistable frequency discriminators in which a shock excited oscillatory circuit provides a reference period for conduction of one side of a bistable device, the total period of which is established by the instantaneous frequency of a frequency modulated wave.

Typical frequency discriminators include circuits for establishing the zero output response points and other operating characteristics of the discriminators. The responses of such discriminators are subject to change, with change of resonant frequency with temperature, and with variation of associated circuit and tube or transistor parameters due to aging, since the latter effect the responses of the circuits. Such discriminators have not been found to provide the accuracy requisite for high accuracy frequency measurement.

A further type of frequency discriminator involves employment of a monostable multivibrator as a frequency measuring device. The multivibrator is designed to have an unstable time equal to the one half the mean period of a frequency modulated wave, and to be slaved to the latter. As the multivibrator oscillates it generates first and second half cycles, in succession, which are equal in frequency to the frequency of the frequency modulated wave. When the slaving frequency deviates from its mean value, the total period of the multivibrator, i.e., the sum of its first and second half cycles, follows the slaving period, i.e., the total time of a cycle of slaving signal and of multivibrator output are maintained equal. On the other hand, the time of the first half cycle itself is maintained independent of the slaving frequency, and depends only on the time constants of the multivibrator, because it is monostable. The difference between the periods of the first and second half cycles of multivibrator output is measured as a measure of slaving frequency. In this type of frequency discriminator accuracy of measurement will be precise if the first half cycle can be kept of constant width, and provided the amplitudes of the output halves of the multivibrator are precisely known, when the widths are measured.

To maintain pulse width constant in a discriminator involves some form of control external of the multivibrator, since the operation of a monostable multivibrator depends on discharge times of RC circuits, which are associated with control devices, such as vacuum tubes or transistors. Operation also depends on firing points of the control devices, such as vacuum tubes or transistors, and on leakages associaed with the RC timing circuits. Accordingly, multivibrators do not retain their timing accuracies as the circuits age, and under varying values of energizing and bias voltage for the control devices.

Therefore, although monostable multivibrator discriminators are more accurate than those employing tuned circuits, and have largely displaced the latter in telemetry applications, they are not ideal.

The present invention provides a bistable frequency discriminator which generates successive cycles, each cycle having a duration determined by the period of a slaving wave, in which one half cycle of output of the discriminator is controlled to equal a complete cycle of oscillation of a high Q shock excited circuit. The period of a high Q shock excited circuit can be made extremely stable, so long as it is unloaded and is therefore freely oscillatory. Assuming such a circuit is composed of an inductance and a capacitance in parallel, only the values of these constants establish the resonant frequency of the circuit, and the effect of driving and energizing and other associated circuits is nil.

In accordance with the invention, a pulse is generated at the beginning of an incoming cycle of frequency modulated slaving wave, which shock excites a parallel tuned circuit by disconnecting it from a source of steady current. The period of the shock excited oscillation equals one half the period of the slaving wave at the mean frequency of the latter. A bistable device is caused to proceed into one conductive state, i.e., to initiate its first half cycle, concurrently with initiation of the cycle of shock excited oscillation, and to proceed to its second conductive state, i.e., to initiate its second half cycle, in response to termination of the cycle of shock excited oscillation.

The bistable device is of the binary counter type, and operates at extremely high speed. Since it is bistable, it changes state only in response to driving signals, and not as a result of its own time constants. It therefore operates precisely, time-wise. The total period of each cycle of operation of the bistable device is precisely equal to the period of the controlling frequency modulated wave. Initial half cycles, however, are of constant durations, independent except as to time of initiation, of the controlling or slaving wave. In consequence, the difference between the initial and following half cycles of operation of the bistable device is proportional to deviation of the period of the slaving wave from its mean period.

It is, accordingly, an object of the present invention to provide a novel frequency discriminator.

It is another object of the present invention to provide a novel frequency discriminator which employs bistable elements, in which the time cycle of the bistable elements is arranged to equal the period of the frequency modulated wave, and in which the period of the bistable device in one of its stable states is controlled to be always precisely equal to the duration of one half cycle of the frequency modulated wave to be measured, at its mean value.

A further object of the invention resides in the provision of a system for controlling bistable devices, so that the duration of one conductive state of the bistable device will remain invariant, by maintaining this conductive state during one cycle of discharge of an oscillatory circuit which is electrically isolated during its ocillatory discharge.

Still another object of the invention resides in the provision of a frequency discriminator for frequency modulated waves having a mean or carrier value, by generating successive pulses, of which the first pulse is equal in duration to the duration of a cycle of the carrier wave, and both together are equal to the period of the frequency modulated wave during its modulation, wherein the duration of the first pulse is referenced to one cycle of discharge of an isolated high Q oscillatory circuit.

The above and still further objects, features and advantages of the present invention will become apparent upon consideration of the following detailed description of one specific embodiment thereof, especially when taken in conjunction with the accompanying drawings, wherein:

FIGURE 1 of the accompanying drawings is a block diagram of a system according to the present invention; and FIGURE 2 is a schematic circuit diagram of an embodiment of the present invention, corresponding generally with the block diagram of FIGURE 1.

Referring now more specifically to FIGURE 1 of the accompanying drawings, the block 10 denotes a source of frequency modulated signal, 11, having a mean or carrier frequency and frequency deviations both above and below the latter frequency. The signal 11 provided by the source 10 is applied to a half wave rectifier 12, the output of the latter being half cycles 13 of the input wave 11. The half cycles 13 of the input wave 11 are applied to slave a multivibrator oscillator 14, the output of which consists of square waves 15, having the same frequency as the input wave 11, but which are of constant and stable amplitude of output. The multivibrator oscillator 14, accordingly, operates as an amplitude limiter, or clipping device. The wave 15 is applied via an amplifier 16 to a bistable flip-flop 17, the latter being extremely rapid in its operation, and to this end being of the type utilized in high speed binary counter circuits and the like. It is stressed that the bistable flip-flop circuit 17 is not a freely running multivibrator, which depends for its frequency upon the time constants of its circuit, but is a circuit which remains in its last stable state until forced into an alternative stable state only in response to a signal, which then accomplishes the change over with extreme rapidity.

A unilateral conduction device is provided, which is specifically illustrated as a vacuum tube 18 in FIGURE 1 (but as a transistor in FIGURE 2) having an anode 19 which is directly connected to a B+ source 20 and having a cathode 21 and a control grid 22. In the cathode circuit is connected a parallel resonant circuit 23 including an inductance 24 and a capacitance 25. The control grid 22 is connected to the bistable flip-flop 17, and in response to the character of the bistable state of the latter is capable of turning the tube 18 selectively on and off, i.e., in converting it from a fully conductive to a fully non-conductive state. Assuming that the multivibrator 14 provides waves 15 having half cycles of positively going output 26, each followed by a half cycle of negatively going output 27, the initial rise of the positively going half cycle 26 causes a negatively going excursion in the output of flip-flop 17, as indicated at point 28 in the output wave 29 of the flip-flop 17. The negatively going wave front 28 cuts off the vacuum tube 18 practically instantaneously, leaving energy stored in the resonant circuit 23. The latter then oscillates, i.e., the discharge of stored energy is oscillatory and in the form of a damped wave, since the circuit is high Q. The voltage oscillation as seen across the oscillatory circuit 23 initially goes negative and then positive, as illustrated at 30, starting from a zero value of oscillatory current, since initially the total circulating current in the tuned circuit 23 is zero. The period of the oscillatory circuit 23 is arranged to be one half the period of the input frequency modulated wave 11 when the latter has its mean value, i.e., is equal to one half the period of the carrier component of the frequency modulated wave 11.

The voltage appearing across the oscillatory circuit 23, i.e., the wave shape 30, is supplied by an isolating amplifier 31 to a squaring circuit 32, which provides at its output a wave shape as 33, i.e., positively going half cycles each followed by a negatively going half cycle. These half cycles are precisely established in duration since they are determined by the half cycles of the wave 30, which in turn is determined entirely by the natural frequency of oscillation of the resonant circuit 23, the latter being unaffected during its oscillatory discharge by connection to any external source or circuit. The squaring circuit 32 supplies signal to a bistable flip-flop 34, the positive rise of the wave 33 causing the flip-flop to attain one stable state, and the negative rise 36 causing the bistable flip-flop 34 to attain its second stable state. Accordingly, a bistable flip-flop 34 provides an output wave having an initial half cycle 37, the duration of which is equal to the total duration of the wave 33 between its positively going front 35' and its positively going termination 36, and this half wave is accordingly precisely equal in length to the total duration or period of one full cycle of the oscillatory wave 30. The positively going edge 38 of the half cycle 37 of the output of bistable flip-flop 34 is applied to the bistable flip-flop 17 via lead 35 to reset the latter into its second stable state, in readiness for initiation of a second cycle of input from the multivibrator oscillator 14. The triode 18 then becomes conductive and supplies energy to tank circuit 23. Initiation of the second cycle of signal 11 returns the bistable flip-flop 17 to its first conductive state, which in turn initiates a second oscillatory wave 30 in the resonant circuit 23, by initiating discharge of the energy stored in inductor 24. The described cycle of events is repetitive.

Accordingly, both the bistable flip-flop 17 and the bistable flip-flop 34 initiate a cycle of operation in response to rise of the first half cycle of the output of multivibrator oscillator 14, i.e., 26 and terminate this half cycle at the end of one complete cycle of operation of the resonant circuit 23, regardless of the frequency of the multivibrator oscillator 14. Both the bistable flip-flop 17 and the bistable flip-flop 34 are triggered back into their first conductive state in response to the initiation of the succeeding cycle of output of the multivibrator oscillator 14, so that the second half cycle of operation of the bistable flip-flop 17 and the bistable flip-flop 34 has a duration determined by the period of the output wave of the multivibrator oscillator 14, i.e., the second half cycle has a duration equal to the duration of a period of the input wave 11 minus the period of the oscillatory circuit 23. The difference between the first and second half cycles of output of the bistable flip-flops 17 and 34, i.e., the difference in durations of the first and second conductive states of these flip-flops, is then a measure of the frequency of the input wave 11, the second half cycles of output of the bistable flip-flops 17 and 34 being longer than the first half cycles when the frequency of the wave 11 is smaller than the carrier frequency, and being shorter when the frequency of the wave 11 is greater than the carrier frequency. The bistable flip-flop 34 is utilized as an output signal device, supplying its output to an amplifier limiter 40, which assures that the output of the flip-flop will have a constant amplitude, and accordingly that the relative energies of the two half cycles of output of the bistable flip-flop 34 will be measured only in terms of their durations. The average energy of output of the amplifier limiter 40 is then a function of deviation of the frequency of the input wave 11 from its mean value. The average value is obtained by connecting an integrating circuit 201 to the output terminal of limiter 40 and a suitable meter 202 to the integrator output terminal.

The block diagram of FIGURE 1 corresponds with the schematic circuit diagram of FIGURE 2. In FIGURE 2 a signal input terminal is provided, to which may be applied a frequency modulated wave 11. The wave 11 appears across the resistances 50 and 51, in series, of which resistance 51 is a potentiometer having a slider 52, which may be set to provide a desired attenuation of the input wave 11, as applied to the remainder of the circuit. The slider 52 is connected through a coupling condenser 53 to the junction of resistances 54 and 55, the later of which is connected back to ground, so that the signal appears across the resistance 55. The resistance 54 is connected in series with the base of a PNP transistor 56, and limits base current thereto. The emitter of transistor 56 is connected through a load resistance 57 to a positive lead 58, and the collector is connected directly to a negative lead 59. The transistor 56 accordingly operates as an emitter follower, applying its output at the emitter of the transistor 56 to the emitter of a further transistor 60. The later is a PNP transistor, having its base connected to the slider of a potentiometer 61. The potentiometer 61 is connected between the positive lead 58 and ground, whereby the base of transistor 60 is positively biased. A collector load 62 is connected between the collector of transistor 60 and the negative lead 59. The potentiometer 61, by establishing a positive bias for the base of the transistor 60, provides a clipping bias for the input signal which is effectively bypassed for all amplitudes below that set into the circuit by the potentiometer 61. The bias is established so as to clip the negative half cycles of the incoming frequency modulated wave 11, as illustrated by waveform 64.

The voltage at the collector of the transistor 60 is applied to the base of an NPN transistor 65, the collector of which is connected to positive lead 58 through a load resistance 66, and the emitter of which is connected to ground through a resistance 67 shunted by a condenser 68, and also is connected to the negative lead 59 through an adjustable resistance 70. The resistances 67 and 70 taken in series provide a voltage divider between ground and negative lead 59, and the emitter of the transistor 65, being connected to the junction of the resistances 67 and 70, is maintained at a predetermined negative bias, less negative, i.e. closer to ground potential than that appearing at the lead 59. The condenser 68 serves to smooth this bias.

The output of the transistor 65 appears across the load resistance 66, or at the collector of the transistor 65 and is applied to a diode 71 which acts as a half wave rectifier. The cathode of the diode 71 is connected to the junction of the resistances 72 and 73, of which the resistance 73 is returned to the positive lead 58 while the resistance 72 is returned to ground, so that a predetermined positive voltage is established at the cathode. The anode of the diode 71 is maintained at a steady voltage sufficient to reverse bias the diode determined by the characteristics of the transistor 65, and by the bias applied to the emitter thereof, and the value of the load resistance 66. There is superposed on this steady bias an inverted replica, approximately, and subject to any clipping which may have occurred, of the input wave 11. It will be understood that the waveform applied to diode 71 may be provided with any desired phase relationship with respect to input wave 11 by appropriate modification of the circuitry preceding the diode in accordance with conventional techniques well known to those of ordinary skill in the art. An in-phase relationship between wave 11 and the waveform appearing at the output of the half wave rectifier, i.e. diode 71, is illustrated, for example, by waveforms 11 and 13 of FIGURE 1, wherein the later comprises rectified half cycles corresponding to and in phase with the positive half cycles of the former across the resistance 73 is a half wave rectified voltage, having clipped half cycles, or portions thereof, corresponding to the related positive half cycles of the waveform applied to diode 71.

The circuit operates satisfactorily whether or not the wave form 13 constitutes the full half waves of the input wave form 11, i.e., the circuit will operate satisfactorily in response to peaks of the wave 11, since the information to be derived from the wave form 11 is merely the timing between alternate half cycles, i.e. the period of each cycle thereof.

The half cycles of signal passed by the diode 71 are applied to the base of a transistor 80 of the PNP type, the emitter of which is returned through a variable resistance 81 to the positive lead 58, and the collector of which is loaded by a resistance 82. The resistance 81 may be termed a sync control resistance, since it establishes the bias on the transistor 80, and therefore can be adjusted to cut off lower segments of the half cycles applied to the base of the transistor 80, retaining any desired portions of the peaks. Further, the value of the resistance 81 establishes the quiescent bias on a further transistor 83, the base of which is connected directly to the collector of the transistor 80. The transistor 83 is of the PNP type, and includes an emitter bias setting resistance 84 connected between the emitter and the positive lead 58, and a collector load 85 connected between the collector and the negative lead 59.

Associated with the transistor 83 is a further transistor 86, which is of the PNP type and which has an emitter connected directly to the emitter of the transistor 83. The transistor 86 includes a collector load 87 equal to the load 85, and the emitter bias setting resistance 84 of the transistor 83 is common to the emitter of the transistor 86. The collector of the transistor 83 is coupled to the base of the transistor 86 through a condenser 88. The collector of the transistor 86 is coupled to the emitter of the transistor 80 through a condenser 89.

In operation, the transistor 80 is biased to be conductive, but in response to half cycles provided by the diode 71, which are positively going, the transistor 80 is cut off. This occurs at the initiation of half cycles of control potential. While the transistor 80 is conductive the potential at its collector is high in a positive sense, and this potential being applied to the base of the transistor 83 maintains the latter cut off. When the transistor 80 becomes non-conductive, its collector potential is decreased to the potential of lead 59, rendering the transistor 83 highly conductive. When the transistor 83 becomes conductive its collector rises in potential in a positive sense, and the rise in potential is imparted to the base of the transistor 86, cutting off the latter. The collector of the transistor 86 then rapidly attains the potential of lead 59, and this rapid change in potential is imparted through the condenser 89 to the emitter of the transistor 80, which becomes negative relative to the base of the transistor 80, since the latter is maintained at fixed bias by resistances 73 and 72. Accordingly, the cut off state of the transistor 80 is confirmed, and the multivibrator consisting of transistors 80, 83 and 86, is in one of its states.

When the base of transistor 80 is more negative than the emitter, that transistor becomes conductive. When the transistor 80 is conductive, its collector goes relatively positive, cutting off the transistor 83 by application of positive potential to the base of the transistor 83. When the transistor 83 cuts off its collector goes highly negative, and that negative potential being applied to the base of the transistor 86 turns the latter on, raising the potential of the collector of the transistor 86. This rise in potential is applied to the emitter of the transistor 80, confirming its conductive state. The multivibrator, 14, comprising the transistors 80, 83 and 86, accordingly oscillates between a first and a second conductive state of each of transistors 83 and 86, in response to incoming rectified half waves. The multivibrator 14 is a true oscillator, providing equal half cycles of output, but is synchronized in respect to frequency by wave 11.

Output is derived from the multivibrator 14, comprising transistors 80, 83 and 86, at the collector of the transistor 86, which is coupled through a coupling condenser 90 and a bias setting resistance 91 to the base of a transistor 93 of the PNP type. The transistor 93 has a grounded emitter and its collector is loaded by a resistance 94, one end of which is connected to the negative lead 59. The transistor 93 operates as a conventional amplifier, corresponding with amplifier 16 of FIGURE 1 of the drawings, and by virtue of the capacitive coupling 90 passes to the succeeding bistable flip-flop 17, pulses 15, having alternately equally positive and negative going halves. The collector of the transistor 93 is directly coupled over a lead 95 to a bistable flip-flop 17, applying "set" pulses to the latter, in response to the initiation of each negatively going half cycle of output signal from transistor 93.

The flip-flop 17 delivers a positively going output pulse to an output lead 96 since in response to each "set" pulse, its right hand half goes into non-conductive state. This pulse is applied across series resistances 97, 98 and 99, the latter of which is adjustable and proceeds to a positive lead 100. The base of a transistor 101 is connected to the junction of resistances 97, 98 and the resistance 97 is provided with a smoothing condenser 102 connected thereacross. On arrival of the positive going wave front at lead 96, a corresponding wave front is applied to the base of transistor 101. The latter is of PNP type and has its emitter grounded for D.C. through an inductance 24. Its base, on the other hand, is biased below ground potential, when the right hand side of flip-flop 17 is conductive, but goes positive when the right hand side of flip-flop 17 becomes non-conductive. Initially, the right hand side of flip-flop 17 is conductive, maintaining the base of transistor 101 negative with respect to ground, and the transistor 101 conductive. The latter is of PNP type, having as its emitter load a parallel tuned circuit 23, and as its collector load a small protective resistance 104. Accordingly, heavy current flows from ground toward a negative lead 105, through the coil 24 of the resonant circuit 23, but the D.C. potential across the condenser 25 is negligible, since this depends on the resistance of the coil 24. On arrival of the positive going pulse at the base of the transistor 101, the transistor becomes non-conductive, while in response to a negative pulse it is conductive. The base of the transistor 101 is normally negative so that the transistor is conductive, and at the beginning of a cycle a positive pulse is applied from the flip-flop 17 over lead 96, rendering the transistor 101 non-conductive.

When the transistor 101 becomes non-conductive, the resonant circuit 23 becomes isolated from its source of current, and the energy stored in its inductance 23 discharges in oscillatory fashion through the condenser 25, the oscillation being damped only very slightly in virtue of any residual resistance which may appear in the circuit. The voltage across the resonant circuit 23 is applied to the base of an NPN transistor 110 through a protective resistance 111.

The collector of the transistor 110 is directly connected to the base of a PNP transistor 112, the emitter of which is connected directly to the positive lead 100, and the collector of the transistor 112 is connected directly to the emitter of the transistor 110, which is loaded to the line 105 through a resistance 113. Discharge of the inductance 24 in oscillatory fashion is initiated by a positive going voltage, as seen at the emitter of the transistor 101, followed by a negative half cycle. The period of the oscillatory circuit is equal to one half the period of the mean frequency of the frequency modulated wave 11 and the transistors 110 and 112 operate as an amplifier, connected in conventional complementary symmetry fashion, to provide amplification of the oscillatory voltage which is applied to a squaring circuit comprising transistors 120 and 121.

The output of the amplifier 31 as it appears at the collector of transistor 112 is applied through a protective resistance 121 to the base of transistor 120, which is of the NPN type operating with emitter grounded and with collector connected through a load resistance 123 to the positive lead 100. The base of the transistor 120 is connected to the positive lead 100 through a resistance 122, and the quiescent bias for the transistor 120 is established primarily by the values of the resistances 113, 121 and 122, to be such that the transistor 120 conducts only while the wave applied to its base is sufficiently positive. The positive value of this bias is so set that negative clipping occurs in respect to the input wave to the transistor 120. Since, however, the transistor circuit configuration is such that phase reversal of voltage occurs at the collector of the transistor 120, a clipped or limited positive half cycle is applied to the base of the transistor 121, preceded by an unclipped negative going portion. The transistor 121 is of the common emitter type, having a collector load 138 which is connected to ground and an emitter which is connected to the positive lead 100, and therefore effects a phase reversal of voltage applied thereto, as indicated at 33. The transistor 121 has its bias adjusted to clip the negative going halves of the wave applied thereto, the positively going halves having been previously clipped by the transistor 120, when they were negatively going, i.e., preceding the phase reversal which occurred in transistor 120. Accordingly, there is applied to the bistable flip-flop 34 a wave form comprising a positively going pulse followed by a negatively going pulse. The duration of the positively going half of the wave 33 is of fixed duration, since it is fixed by the duration of the wave generated by the tuned circuit 23. The flip-flop 34 is triggered into one stable state on initiation, i.e. rise 35 (FIG. 1), of the positively going half of wave form 33, and into another stable state on termination, i.e. rise 36 (FIG. 1), of the negatively going half of wave form 33, and at that time transfers a reset pulse over lead 132, and via transistor amplifier 133, to the bistable flip-flop 17. The latter transfers to its second stable state, applying negative bias to the base of transistor 101, rendering the latter conductive, and re-storing energy in coil 24, preparatory to initiation of a further cycle of signal wave 11.

The output terminal 140 is connected to the cathode of a diode 141, the anode of which is grounded. It follows that so long as terminal 140 is connected to a positive voltage source, the positive voltage is available at the terminal, but that application of a negative voltage to terminal 140 will bring the latter to ground potential, since diode 141 then becomes conductive.

In the system of FIGURE 2, lead 100 is connected via resistance 142 to terminal 140. The terminal 140 is also connected to a negative terminal 143 through the emitter to collector resistance of an NPN transistor 144 and a resistance 145. So long as the transistor 144 is cut-off no current flows through resistance 142 and the potential of terminal 140 equals that of lead 100. When transistor 144 becomes conductive, on the other hand, the potential of the collector of NPN transistor 144 goes negative, bringing the potential of terminal 140 accurately to ground potential.

To enable transistor 144 to operate as a switching device, its emitter is connected to the junction of resistances 145 and 146, which are connected between terminal 143 and ground. This establishes a fixed negative potential for the emitter. The base of transistor 144 is connected to terminal 143 through a resistance 147.

An NPN transistor 148 is provided having its emitter connected directly to the base of transistor 144, and its collector directly to line 100. So long as transistor 148 is non-conductive the base of transistor 144 is more negative than the emitter, and transistor 144 is cut off. When transistor 148 is conductive, on the other hand, its emitter attains nearly the potential of lead 100, and transistor 144 becomes conductive.

The transistor 148 is changed from its conductive to its non-conductive state by transistor 133, a PNP transistor connected with emitter grounded, collector connected to the base of transistor 148 through a relatively small current limiting resistance 149, and its base connected to ground through a resistance 150, and to one side of bistable flip-flop 34 through a D.C. blocking capacitor 151.

The capacitor 151 assures that a wave form corresponding with 33, applied thereto, will be seen at the base of transistor 133 as a wave form alternately positive and negative going with respect to ground. The positive going portion of the wave gates off transistor 133, while the negative going portion gates it on. The transistor 133 thus provides or disestablishes a path for the base of transistor 148, to ground.

When transistor 133 is conductive the base of transistor 148 is grounded, the transistor becomes conductive, making the base of transistor 144 positive and rendering that transistor conductive. In such case the potential of terminal 140 seeks to go below ground, but is held at ground potential by diode 141. When transistor 133 is non-conductive, opposite conditions prevail at all transistors and the potential at terminal 140 is that of lead 100.

The length modulated and spaced pulses availble at terminal 140 may be readily converted to D.C. representative of their difference by passing the pulses through a capacitor and integrating, in conventional fashion.

While I have described and illustrated one specific embodiment of my invention, it will be clear that variations of the details of construction which are specifically illustrated and described may be resorted to without departing from the true spirit and scope of the invention as defined in the appended claims.

What I claim is:

1. A system for synchronizing the operation of a bi-stable device having alternative stable states, comprising a normally quiescent resonant circuit, means for initiating a cycle of self-oscillation of said resonant circuit in response to attainment of one of said stable states by said bi-stable device, and means for translating said bi-stable device to the other of said alternative stable states in response to completion by said resonant circuit of said cycle of self-oscillation.

2. The combination according to claim 1 wherein said initiating means includes a unilateral control device, said resonant circuit being in series with said unilateral control device.

3. The system of claim 1 wherein said means for initiating is immediately responsive to attainment of said one state.

4. The system of claim 1 wherein said means for translating shapes said cycle of self-oscillation into a rectangular wave having a duration equal to that of said cycle.

5. A frequency discriminator for a frequency modulated wave, comprising a bi-stable device having alternative first and second stable states, means responsive to attainment by said frequency modulated wave of a predetermined cyclic point in each cycle thereof for driving said bi-stable device into one of said stable states, a normally quiescent oscillatory circuit, means for initiating a cycle of self-oscillation of said oscillatory circuit in response to attainment by said bi-stable device of said one of said stable states, and means for actuating said bi-stable device into the other of said alternative stable states in response to completion by said circuit of said cycle of self-oscillation.

6. The combination according to claim 5 wherein is provided means coupled to said bi-stable device for measuring the difference in the interval of time over which said bi-stable device is in said one of said stable states and the interval of time over which said bi-stable device is in said other of said stable states, between successive ones of said predetermined point in each cycle of said frequency modulated wave.

7. The combination according to claim 5 wherein said means for initiating includes a unilateral control device connected in series with said oscillatory circuit and having conductive and non-conductive states, said cycle of self-oscillation being initiated upon translation of said unilateral control device from said conductive to said non-conductive states.

8. In a frequency discriminator for a frequency modulated signal having a mean frequency represented by a carrier signal and having frequency deviations therefrom representing intelligence transmitted on said carrier signal, normally inactive means for generating a periodic signal of fixed frequency, said fixed frequency being an integral multiple, including one, of said mean frequency of said frequency modulated signal, means for activating said generating means in response to attainment of a predetermined point in each cycle of the frequency modulated signal, and means for de-activating said generating means in response to completion of a predetermined number of cycles of said periodic signal.

9. The apparatus according to claim 8, wherein a first time interval is defined by the time between said attainment of said predetermined point in each cycle over two successive cycles of said frequency modulated signal, and a second time interval is defined by the time consumed for generation of said predetermined number of cycles of said periodic signal, and wherein is further included means coupled to said generating means for comparison of said first and second time intervals to provide a measure of the instantaneous frequency of said frequency modulated signal.

10. The apparatus of claim 8 wherein said generating means comprises a sinusoidal oscillator.

11. The apparatus of claim 10 wherein said oscillator is shock excited.

12. In a frequency discriminator, a source of frequency modulated signal having a mean carrier frequency and frequency deviations therefrom, first means for generating reference waves of predetermined fixed duration proportional to said mean frequency of said frequency modulated signal, second means for generating pulses of invariable predetermined amplitudes and of durations always proportional to the instantaneous frequency of said frequency modulated signal, and third means coupled to said first and second means for comparing said predetermined fixed duration of said reference wave and said duration of said pulse proportional to said instantaneous frequency to provide an output proportional to the frequency deviation of said frequency modulated signal from said mean frequency, said first means including a shock excited oscillating circuit for generating said reference waves in response to said frequency modulated waves.

13. A frequency discriminator for a frequency modulated signal having a mean carrier frequency and frequency deviations therefrom corresponding to intelligence transmitted by said carrier frequency, normally inactive means for generating a periodic signal of fixed frequency, said fixed frequency being an integral multiple, including one, of said mean frequency of said frequency modulated signal, means for activating said generating means in response to attainment of a predetermined point in each cycle of the frequency modulated signal, means for de-activating said generating means in response to completion of a predetermined number of cycles of said periodic signal, whereby said generating means has alternate active and inactive periods wherein said predetermined number of cycles of said periodic signal is generated and wherein no periodic signal is generated respectively, and means for comparing the time durations of said alternate active and inactive periods of said generating means.

14. A bi-stable frequency discriminator, for a frequency modulated wave having frequency deviations above and below a carrier frequency in accordance with the intelligence transmitted on said carrier frequency, said discriminator comprising means for deriving a reference signal from said frequency modulated wave at a predetermined point in each cycle of said wave, said reference signal establishing a time reference point, a bi-stable device having first and second stable states, means for applying said reference signal to said bi-stable device to trigger said device into said first stable state, shock excited means for providing a timing signal after a fixed elapsed time relative to said reference signal, said fixed elapsed time equal to one half the mean period of said frequency modulated wave, said mean period defined by the period of one complete cycle of said carrier frequency component of said wave, means for applying said timing signal to said bi-stable device to trigger said device into said second stable state, said bi-stable device thereby successively assuming said first and second stable states between application of successive reference signals thereto, said first stable state being assumed for a time interval equal to said fixed elapsed time and said second stable state being assumed for a time interval proportional to said frequency deviation from said carrier frequency, and means for measuring the difference between said time intervals said bi-stable device is in said first and said second stable states as a measure of the instantaneous frequency of said frequency modulated wave.

15. A frequency discriminator for a frequency modulated wave having frequency deviations from a mean frequency value in accordance with intelligence transmitted on said mean frequency, said discriminator comprising bi-stable means having alternative stable states, shock excited means for generating signals each having an initial reference point corresponding to attainment of a predetermined point in each cycle of said frequency modulated wave and each having a completion point after a fixed elapsed time relative to said reference point, said fixed elapsed time being proportional to said mean frequency value, means coupling said frequency modulated wave to said shock excited means, means for applying said signals generated by said shock excited means to said bi-stable means to trigger said bi-stable means into a first of said stable states at said signal initial reference point and to trigger said bi-stable means into the other of said stable states at said signal completion point, whereby said first stable state is assumed by said bi-stable means for a time interval proportional to said mean frequency value and said other stable state is assumed for a time interval proportional to said frequency deviation from said mean frequency value, and means for comparing said time intervals said alternative stable states are assumed as a measure of the instantaneous frequency of said frequency modulated wave.

16. A frequency discriminator for a frequency modulated wave having frequency deviations from a mean carrier frequency in accordance with intelligence modulating said carrier, said discriminator comprising a first bi-stable device having alternative stable states, means responsive to attainment of a predetermined cyclic point in each cycle of said frequency modulated wave for driving said first bi-stable device into one of said stable states, a normally conductive unilateral control switch, a parallel resonant circuit connected in series with said switch and thereby normally having electrical energy stored therein, means responsive to attainment of said one stable state by said bi-stable device for rendering said switch non-conductive to produce self-oscillation of said resonant circuit, said self-oscillation having a predetermined period equal to one half the period corresponding to said mean carrier frequency of said modulated wave, a second bi-stable device having alternative stable operating regions, means coupling said resonant circuit to said second bi-stable device to trigger said second bi-stable device into first and second of said stable operating regions in accordance with respective initiation and termination of said period of self-oscillation, means for setting said first bi-stable device into the other of said stable states in response to triggering of said second bi-stable device into said second of said stable operating regions, whereby said first and said second bi-stable devices are substantially synchronous in cyclic bi-stable operation, and means coupled to one of said bi-stable devices for measuring frequency deviations from said mean carrier frequency of said modulated wave as a function of said cyclic bi-stable operation.

References Cited by the Examiner
UNITED STATES PATENTS

| | | | |
|---|---|---|---|
| 2,467,777 | 4/49 | Rajchman | 328—223 X |
| 2,537,077 | 1/51 | McVay et al. | 328—223 |
| 2,549,776 | 4/51 | Cleeton | 328—223 |

ARTHUR GAUSS, *Primary Examiner.*

HERMAN KARL SAALBACH, ROY LAKE,
*Examiners.*